Dec. 8, 1931.  M. L. JEFFREY  1,835,220
RECORDING APPARATUS
Filed April 10, 1930  6 Sheets-Sheet 1

Inventor
MAX L. JEFFREY.
By Richey & Watts
Attorney

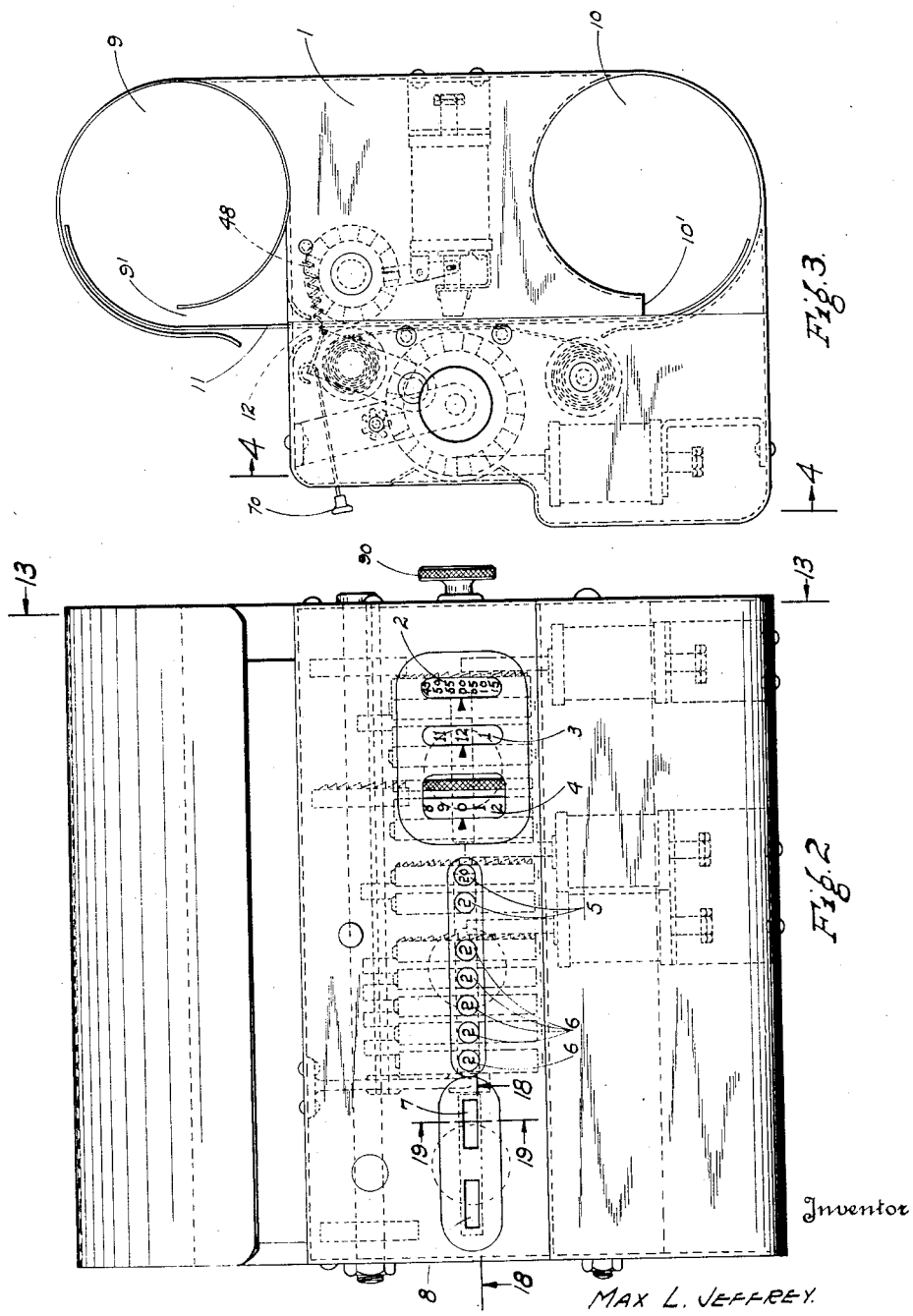

Dec. 8, 1931.  M. L. JEFFREY  1,835,220
RECORDING APPARATUS
Filed April 10, 1930   6 Sheets-Sheet 3

Inventor
MAX. L. JEFFREY.
By Richey & Watts
Attorney

Dec. 8, 1931.    M. L. JEFFREY    1,835,220
RECORDING APPARATUS
Filed April 10, 1930    6 Sheets-Sheet 4
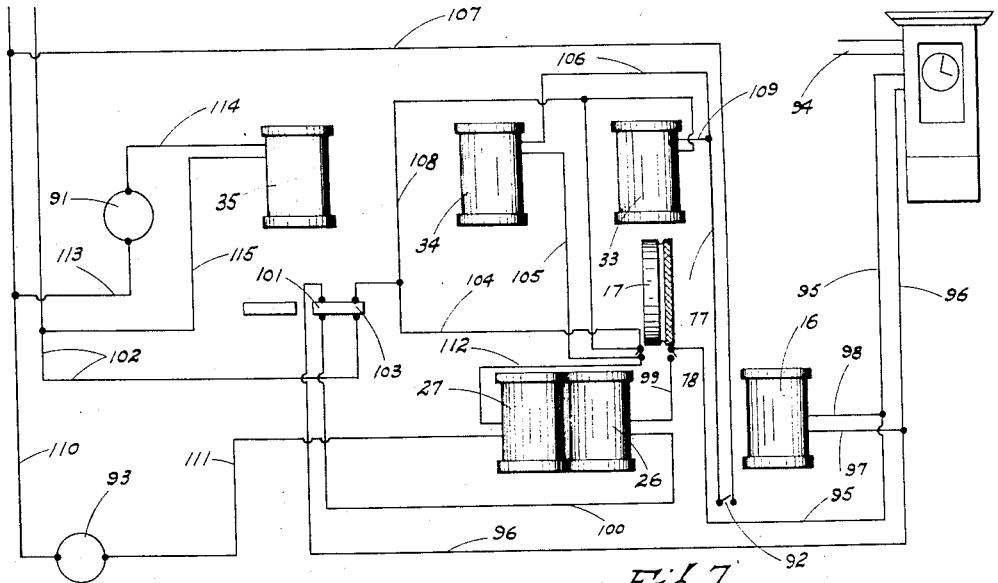
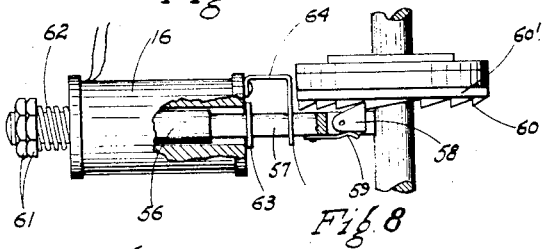
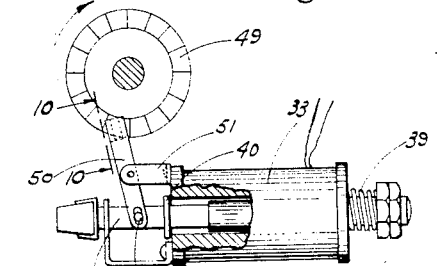
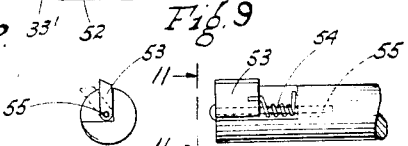
Inventor
MAX L. JEFFREY.
By Richey & Watts
Attorney

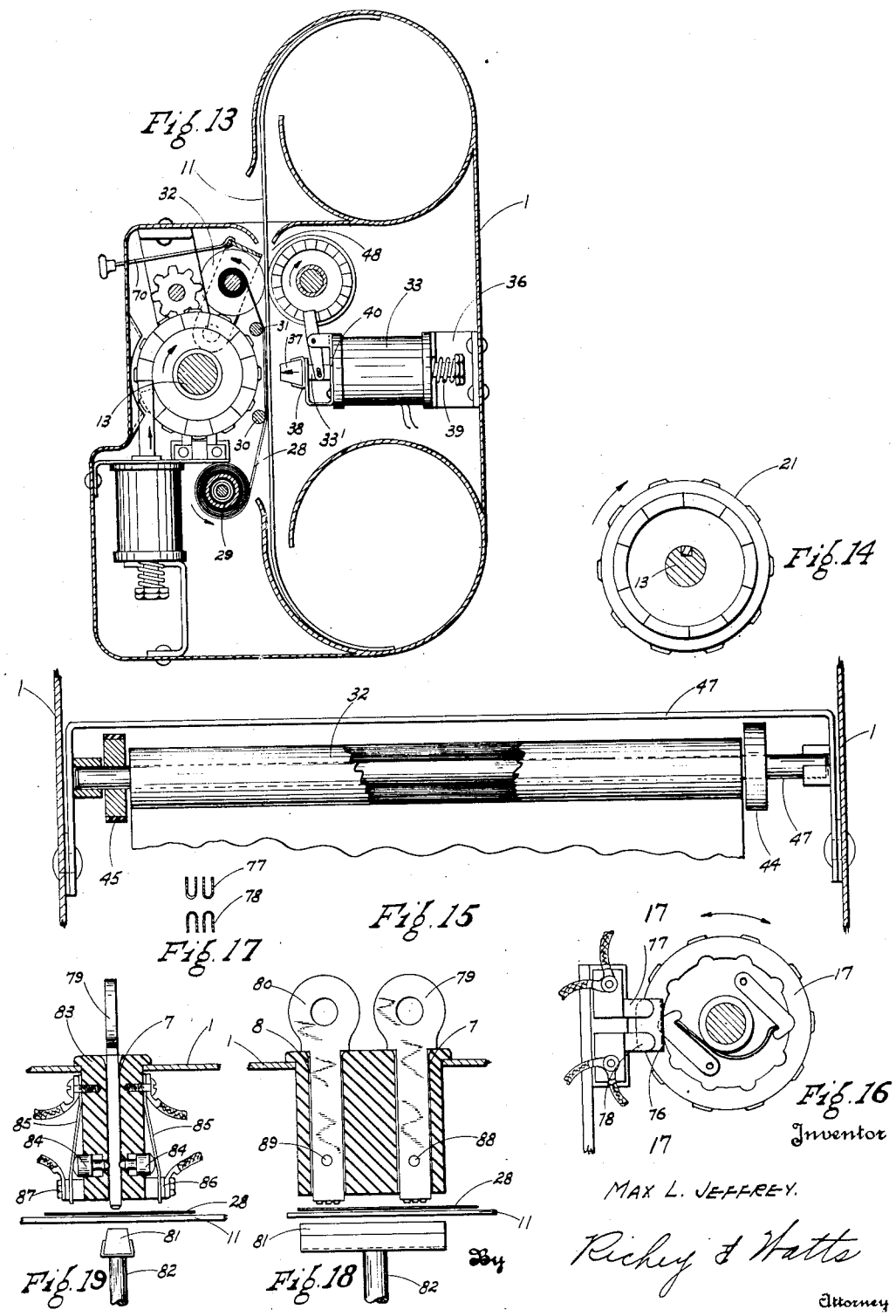

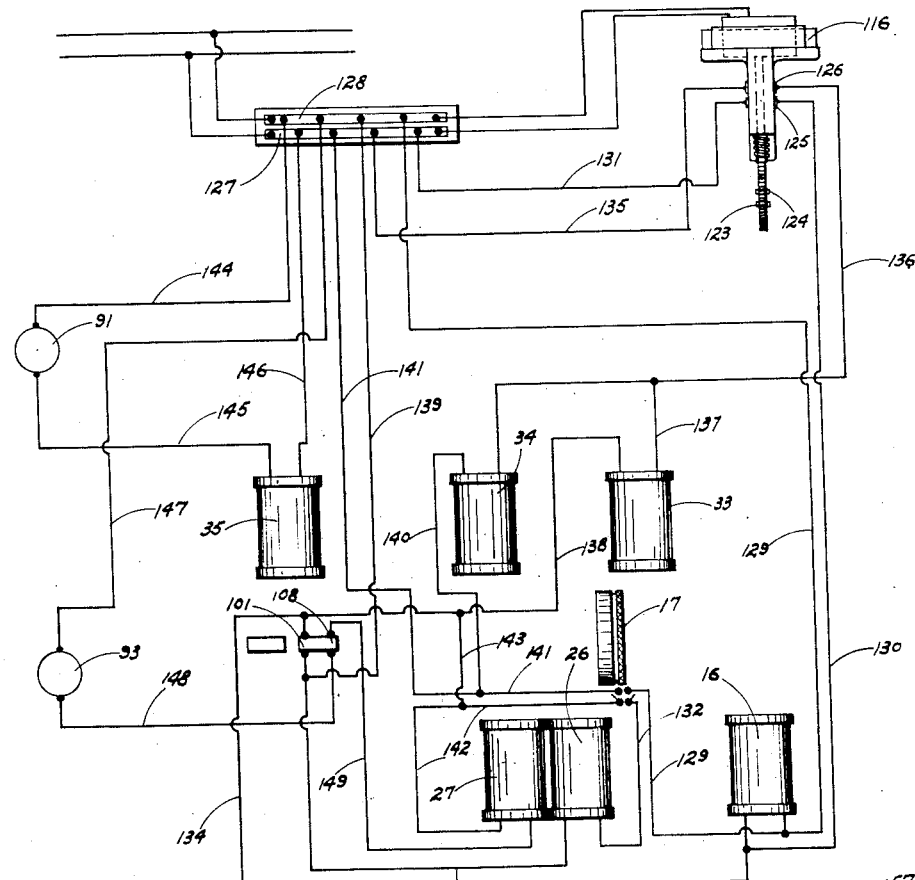
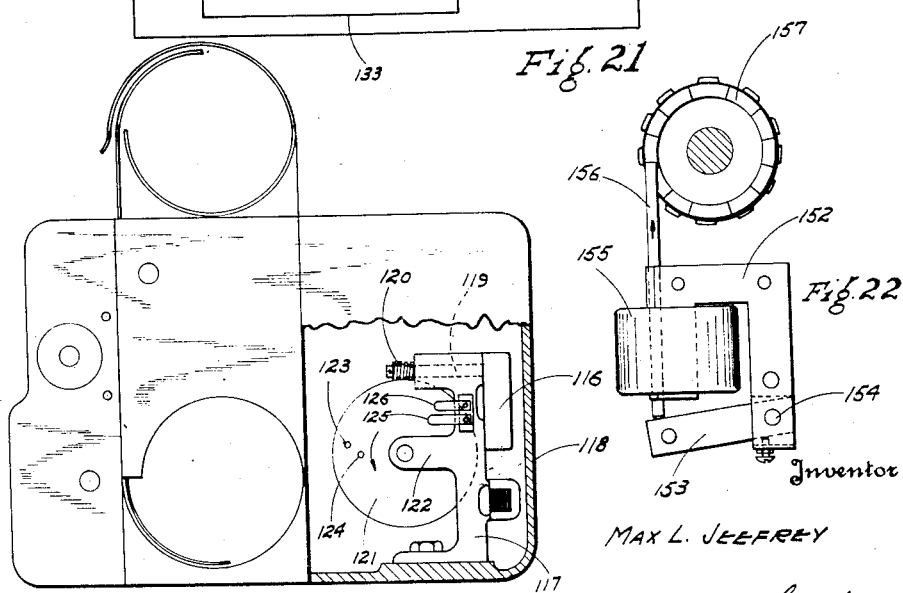

Patented Dec. 8, 1931

1,835,220

UNITED STATES PATENT OFFICE

MAX L. JEFFREY, OF SHAKER HEIGHTS, OHIO

RECORDING APPARATUS

Application filed April 10, 1930. Serial No. 443,052.

This invention relates to recording machines and more particularly to apparatus for use in factories for keeping complete and accurate records of the production output and workman's time.

In modern factory and shop organization, complete and accurate records of the production output of each machine and the machine operator's time are essential to the economical and efficient operation of the plant. In addition to being of value in keeping account of the number of parts made these records are of great value in setting the rate of compensation of the employee. This is true whether the employee be paid on a time or a piece work basis and, in the past, numerous efficiency systems and mechanical devices have been developed to assist in keeping proper time and production records. By the use of these systems and devices reductions in manufacturing costs have been secured and both the production output and the workman's earnings have been increased. However, no one of these systems and devices of which I am aware furnish all of the information valuable in setting piece work rates and keeping proper records of production and the workman's time.

It is among the objects of my invention to provide a machine or device which will make a complete printed record of the history of the daily operation of any one particular shop machine and of the operator's time; to provide a recording device which will make a printed record indicating the total number of pieces produced by the machine over any certain period of time, the time during which the machine is idle and the reason for such idleness, the identity of the workman operating the machine and the time which he checks in in the morning and the time he ceases work in the evening; the provision of a recording device which will record the identity of the set-up man, foreman, inspector or other person who may at various times during the day stop at the machine for some purpose, and the length of time during which he is at the machine in question; the provision of a simple and economically constructed recording device which may be located directly at the work point or at a point remote from the work point such as the manager's office; the provision of a recording device which will operate only when the workman's key is inserted therein, and which, therefore, cannot be tampered with and caused to indicate falsely; the provision of a recording device, which will make a printed record of the various items at certain definite time intervals, for example every five minutes during the day; the provision of a recording device which will indicate the total production time of the machine for each daily period; the provision of a mechanical recording device which will eliminate the necessity of a large number of clerks and the consequent expense thereof and which will record the desired production and workman's time information accurately and clearly in very convenient form; the provision of a recording device which will provide printed records of the shop production of great value in facilitating time study work and also the work of the factory cost department; the provision of a recording device which will keep such records of the machine and the workman's production that the workman will be urged to work at the greatest efficiency and thus turn out the largest number of units per period of time.

The above and other objects of my invention will appear from the following description of a preferred embodiment thereof, reference being had to the accompanying drawings, in which:

Fig. 2 is a front elevation of my recording device;

Fig. 3 is a side view of the recording device shown in Fig. 2;

Fig. 7 is a wiring diagram illustrating the electrical connections of the recording device shown in Fig. 2;

Fig. 8 is a detached detailed view of a number wheel actuating solenoid with its plunger and ratchet arrangement;

Fig. 9 is a detached detailed view partly in section of a printing solenoid and the card feeding ratchet mechanism;

Fig. 10 is an enlarged detailed view of the end of the ratchet arm shown in Fig. 9;

Fig. 11 is an end view of the ratchet arm shown in Fig. 10 taken on the line 11—11 of Fig. 10;

Fig. 12 is a representation of a typical production record and workman's time card as printed by my recording device;

Fig. 13 is a view taken on line 13—13 of Fig 2.;

Fig. 14 is a fragmentary section taken on line 14—14 of Fig. 4;

Fig. 15 is a fragmentary view partly in section illustrating the upper ink ribbon roll and its support;

Fig. 16 is an enlarged detached view of the operation and idle time indicating and recording number wheel with its accompanying switch mechanism taken on line 16—16 of Fig. 4;

Fig. 17 is a section taken on line 17—17 of Fig. 16;

Fig. 18 is a fragmentary section taken on line 18—18 of Fig. 2 illustrating the workman's and the foreman's or inspector's keys in position;

Fig. 19 is a fragmentary section taken on line 19—19 of Fig. 2;

Fig. 20 is a side elevation, partly in section, of a modified form of my recording device;

Fig. 21 is a wiring diagram of the modified form of my invention shown in Fig. 20;

Fig. 22 is a detached view of an electromagnet which may be used to actuate the printing wheels and printing means.

Figure 1:
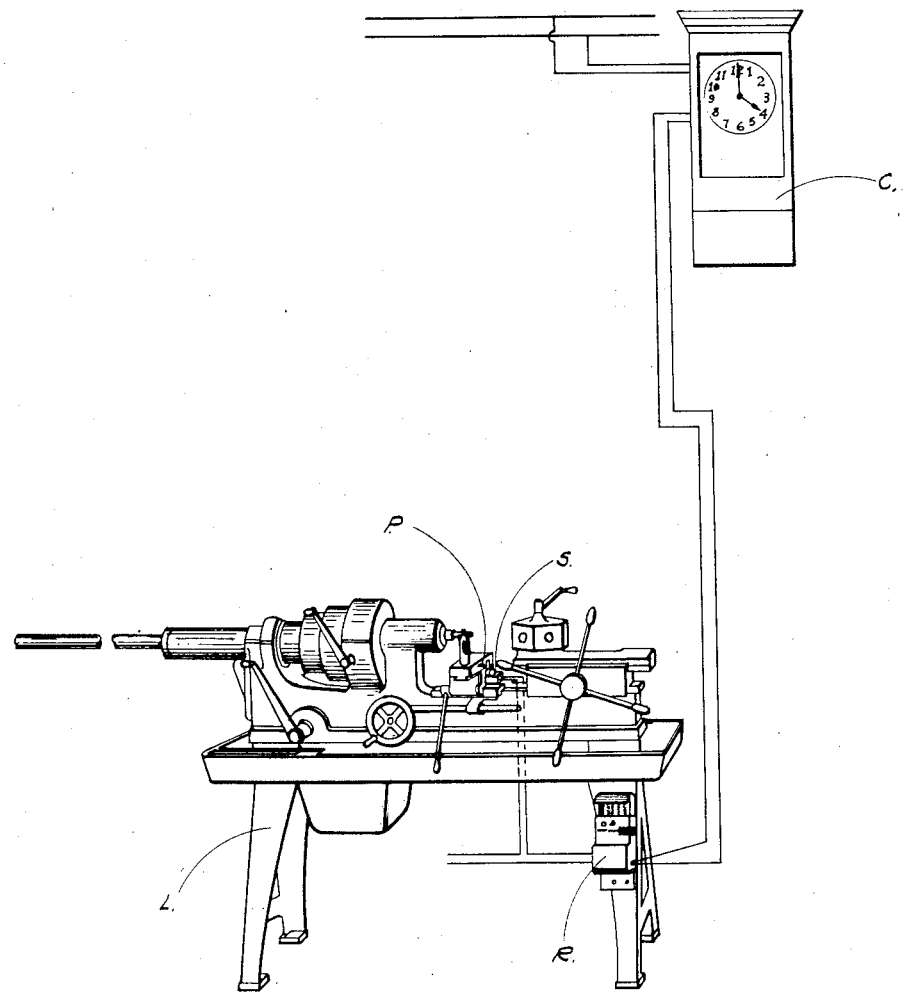
Fig. 1 illustrates my recording device installed in position on a hollow spindle turret type of lathe which is set up for cutting off lengths of bar stock.

In Fig. 1 of drawings my recording device R is shown in position on a turret lathe L. It will be understood that the recording device may be attached to any type of machine tool or used in any other location such as a workman's bench where it is desired to secure accurate production and time records. The machine illustrated is set up to cut off lengths of bar stock, and a switch S is secured to the body of the tool and is operated by a projection P on the tool slide. Whenever the machine is operated to cut off a length of stock the tool slide moves transversely of the bed of the machine carrying the projection P. After the stock is cut off this projection P engages the switch S causing it to complete the circuit to the recording device and thus record the completion of a piece. This recording of the cutting off of the piece is done only when the operation indicating printing wheel of the machine is set at 0, as will be more fully explained later. The recording device R, however, is also electrically connected to the time clock C. This clock C may be of any desired and suitable type which will close an electric circuit at definite time intervals. It need not necessarily be a clock, but may be any kind of electric circuit closing mechanism which will cause an electric circuit to be momentarily closed at definite time intervals. The recording device is also connected to a supply line as indicated and for purposes to be more fully described later.

It will be clear to those skilled in the art that my recording device need not be installed directly on the machine, as illustrated, but may be installed at any point on the machine or adjacent thereto. For example, where a battery of machines of one type are operating as a department, all the recording devices might be mounted on a single board so that the foreman can keep accurate account of the operation of each machine in the department without visiting each individual operator and machine. A group of recording devices may be operated by a single time clock or other circuit making and breaking apparatus or individual circuit making and breaking means may be provided for each records device and may, if desired, be made an integral part of the recording device.

Before explaining fully the details of construction of my recording device, I will discuss briefly the various functions which it is adapted to perform. In factory organization it is of prime importance to keep accurate records of the number of pieces produced. Therefore, my recording device includes a counting mechanism actuated by means of a switch installed at a convenient point on the production machine so that the switch will be thrown to close an electric circuit at the completion of each piece. An illustrative form of this switch installation is shown in Fig. 1 of the drawings. Another important record which must be kept in factory organization is that of the workman's time or hours of employment. My recording device does this very accurately by means of a key which is furnished the workman and which he inserts in the recording device when he checks in in the morning and which he removes from the recording device when he leaves. Thus my apparatus eliminates the necessity of the standard time clock and time card system. The workman's time is recorded on the same card on which the production output is indicated. As soon as the workman's key is inserted in the recording device the time, in five minute, or any other suitable and desirable intervals, is printed on the time and production record card. In making times studies and in setting the rate of compensation of the workman it is very desirable and advantageous to know how much of the time the machine is idle and the reason for such idleness. Therefore, I have incorporated in my recording device mechanism for indicating on the card the time during which the machine is not producing and the reason for such idle time.

Other functions than those described above are adapted to be performed by my machine and will appear from the following description of my invention.

The operating mechanism is enclosed in a casing or housing 1 which, as illustrated, is made of sheet metal, but which may be cast or otherwise formed. This casing 1 is provided on its front side with windows, through which the various number wheels are exposed, and with key holes or slots for the insertion of the operator's key and of the foreman's or inspector's key. Referring to Fig. 2, the window 2 exposes the minute indicating number wheel of the actual time of day recording means. Window 3 exposes the hour indicating number wheel. Window 4 exposes the operation indicating number wheel and is large enough to permit this wheel to be set by the operator. Windows 5 exposes the cumulative production time recording wheels and the windows 6 each expose one of the piece counter printing wheels. The key hole 7 is adapted to take the operator's key and the key hole 8 is for the foreman's or inspector's key, as will be more fully explained later.

At the upper rear of the housing 1 is provided a cylindrical enclosing and guiding chamber 9 for the time card. A similar chamber 10 is formed at the lower rear portion of the housing 1. These chambers 9 and 10 are provided with slotted openings 9' and 10', through which the card projects.

The card 11 is preferably of rather stiff paper and may be inserted into the device by pushing its lower end through the aperture 12 in the top of the housing 1. The card is pushed down until it enters the lower chamber 10 and is in the proper position for printing the production and time records. This positioning of the card may be facilitated by providing an index mark on the card which will coincide with a certain part of the recording device when the card is in the proper starting position.

The counters which I employ to record the number of pieces made, the cumulative production time, etc., are of the successively operating number wheel type. This type of counter is sometimes called an Australian counter and its construction and method of operation form no part of this invention and is so well known that it need not be fully described here. These counters are actuated by electro-magnetic means, such as solenoids or electro-magnets, which will be more particularly described later.

Figure 4:
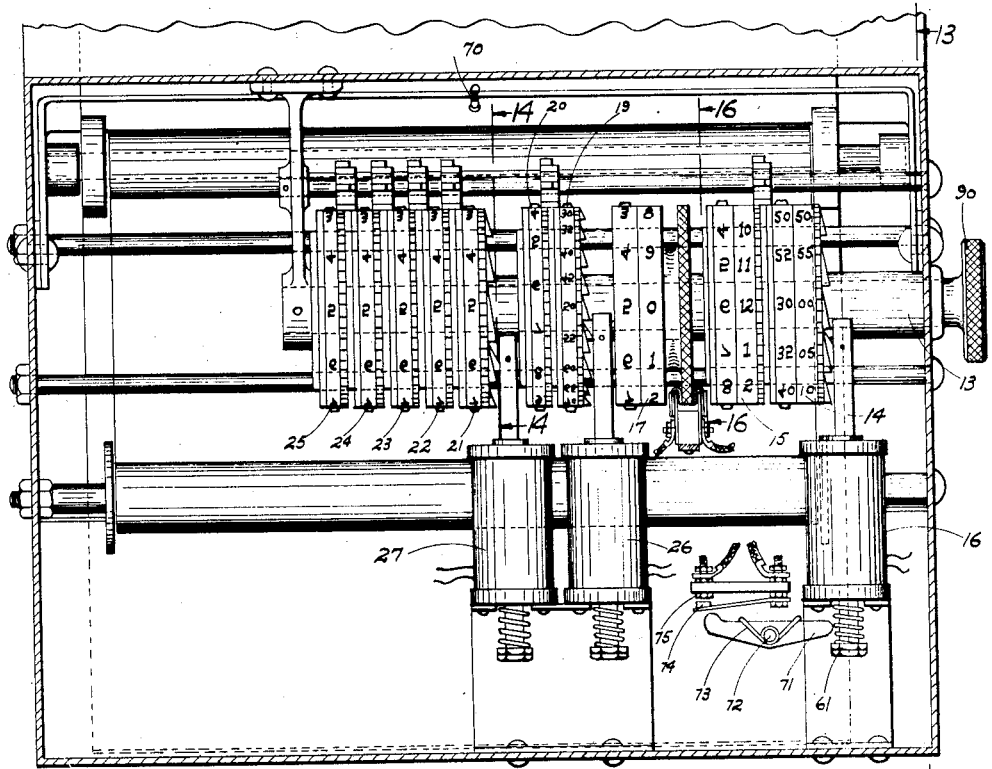
Fig. 4 is a vertical section taken on line 4—4 of Fig. 3.
Figure 5:
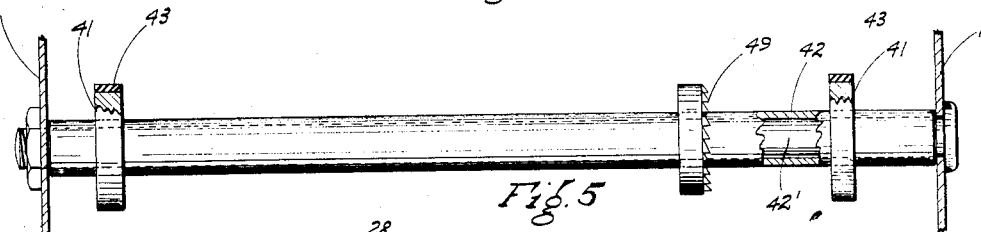
Fig. 5 is a detached view partly in section of the card feeding rollers.
Figure 6:
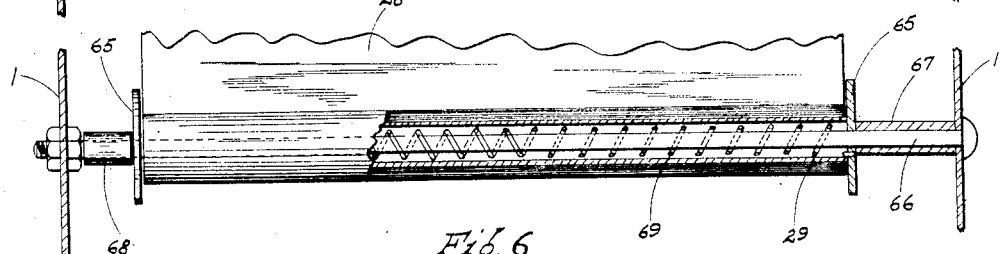
Fig. 6 is a view partly in section showing the construction of the lower ink ribbon roll.

The "printing wheels" which indicate and print the various time and production records are all mounted on the shaft 13. As best seen in Fig. 4, the first printing wheel 14 on the right hand side of the device carries numbers from 0 to 60 in intervals of 5. This wheel 14 operates in conjunction with the wheel 15 which carries numbers from 1 to 12 inclusive. These two wheels 14 and 15 co-operate to indicate and print the actual time of day at 5 minute intervals. In setting up the recording device and starting it in operation, the wheels 14 and 15 are set to coincide with the actual time of day; that is, if the device is put in operation at 8 o'clock in the morning, the wheel 15 is set at 8 and the wheel 14 at 00. The clock 3 closes the circuit to a solenoid 16 every 5 minutes and the solenoid through its movable core and ratchet mechanism (later described) actuates the dial 14 moving it up one number each time the circuit is closed. In operation, the printing wheel 14 is moved at 5 minute intervals making a complete revolution in one hour. Once during each revolution it picks up the printing wheel 15 causing it to move up one number. Thus the time of day within five minutes may be read from the two wheels 14 and 15 and they are also adapted to print on the record card the actual time of day in 5 minute intervals. The wheels 14 and 15 are provided with double rows of numbers, one group being raised and adapted to print the time on the card, and the others which are those seen through the windows 2 and 3, indicating what is being printed by the printing numbers.

The operation indicating number wheel 17 is also a double wheel, in that it has raised printing numbers and also indicating numbers which are seen through the window 4. A knurled portion 18 is formed on this number wheel, which portion 18 is also exposed by the window 4 so that the wheel can be set at any desired number by the operator. As illustrated this wheel contains numbers 0 to 9 inclusive, but any desired number of figures may be formed on the wheel. This wheel is not operated by electro-magnetic means as are the others and merely serves to print on the card a number which corresponds to some certain operation or condition of the machine. It also incorporates a switch mechanism which will be more fully described later. For example, when the wheel 17 is set to print 0, it may be assumed that the machine is on production. The numeral 1 may be used to indicate that the machine is not producing because it is set up. The numeral 2 may be used to indicate idle time caused by breakdown of some part of the machine. The numeral 3 may be used to indicate stoppage of the machine due to power failure. Thus the numbers may be used to designate any contingency or reason for which the machine and the operator are not working on a production basis. The next group of printing wheels, 19 and 20, are graduated to indicate and print the cumulative production time in minutes. That is, the wheel 19 reads up to 95 in minutes and then picks up and moves the wheel 20, which moves only one number for each complete revolution of the wheel 19.

The next group of printing wheels 21, 22, 23, 24 and 25 are also provided with raised printing numbers and form a standard successive number wheel type of counter for recording and printing the number of pieces made. Wheel 21 indicates units, wheel 22 tens, wheel 23 hundreds, wheel 24 thousands and wheel 25 ten thousands.

The production time indicating and printing wheels 19 and 20 are actuated by solenoid 26, which is connected to be energized every five minutes at the same time as the solenoid 16. However, this solenoid 26 is operated only when the operation indicating wheel 17 is set at 0. This is accomplished by means of a switch on the wheel 17, and will be described more fully later. The solenoid 27 actuates the wheels 21, 22, 23, 24 and 25 which comprise the production counter. This solenoid 27 is connected to an electric circuit which is made and broken by a switch on the machine tool or adapted to be operated by the workman in the case of bench work. Such a switch is indicated at S in Fig. 1. This solenoid is also controlled by the switch on the operation indicating wheel 17 so that it may be energized only when the operation wheel 17 is set on 0. Thus the piece counter only counts the number of pieces which are made during the machine's actual production operation. It does not indicate any trial pieces or pieces which are made during the setting up or adjustment of the machine.

An inked ribbon 28 which may be of the same type of material as used for typewriter ribbons, and of a width substantially the same as that of the record card, is wound on a bottom supply roll 29 and lead upwardly over a pair of guide rods 30 and 31 to the upper take-up roll 32. As is clearly seen in Figure 13, the card 11 extends parallel to and substantially is contact with the ribbon 28 for a portion of its length. The ribbon 28 is located by the guide rods 30 and 31 so that it is closely adjacent the numbers on the printing rolls which lie on a horizontal plane passing through the center of the shaft 13.

The printing solenoids 33, 34 and 35 (see Figs. 7 and 13) are located directly behind the card 11 and have their longitudinal center lines lying in the horizontal plane passing through the center line of the shaft 13.

These solenoids are supported on suitable brackets 36 which are secured to the rear wall of the housing 1. The plungers of the solenoids carry laterally extending members or platens 37. These printing platens 37 may be made of hard rubber, brass or other suitable material and are secured to the plungers of the solenoids in dovetailed slots in the platen holders 38. The printing member of each of the solenoids 33, 34 and 35 is of such length that it will cause the desired number of figures to print through the ribbon on to the record card.

The solenoid plunger 33' has a printing platen 37 which is adapted to extend the width of and print the numbers on the time indicating wheels 14 and 15 and the operation indicating wheel 17.

The solenoid 34 is adapted to print the numbers on the cumulative production time indicating wheels 19 and 20 and on the piece counter wheels 21, 22, 23, 24 and 25. The solenoid 35 actuates a plunger to which is secured a printing platen 81 which is adapted to print the numerals on the operator's or foreman's keys when they are inserted in the slots 7 and 8.

These printing solenoids 33, 34 and 35 all operate in substantially the same manner. Referring to Figure 13, the solenoid 33 is illustrated in the off position. When the electrical circuit through the solenoid coil is completed the plunger 33' which is secured to the core or armature, is thrown to the left by the magnetic action of the solenoid coil on the core and the printing member 37 pushes against the card 11 forcing it, together with the ribbon 28, against the numerals on the number wheels 14, 15 and 17. The pressure of the printing member 37 against the back of the card causes the numbers to be printed on the front of the card. When the circuit through the solenoid is broken the spring 39 withdraws the plunger 33' until the shoulder 40 on the plunger strikes against the end of the solenoid. The other printing solenoids, 34 and 35, operate in this same manner, the printing taking place only when the circuit through the solenoid coil is closed causing the printing member to be forced against the card and the numbers on the number wheels to be printed thereon.

The embodiment of my invention, which is illustrated in the drawings, is adapted to record the various time and production figures at 5 minute intervals. It is, therefore, essential that the card 11 be moved between each 5 minute printing operation so that the various records will be printed on successive lines of the card. This intermittent movement of the card 11 is accomplished by the rollers 41 which are secured to the tube 42, which is in turn rotatably mounted on the rod 42'.

The surface 43 of the rolls 41 is preferably rubber or other material which will prevent slippage between the rolls and the card 11. The card 11 is held in contact with the surface 43 of the rolls 41 by means of rolls 44 and 45 (Fig. 15) which are mounted on the same shaft 46 as the upper ribbon take-up roll 32.

As best seen in Fig. 15 this upper ribbon roll 32 is mounted on a shaft 46 which is supported by bearings mounted on a yoke 47. This yoke 47 is pivotally secured at its ends to the side walls of the housing 1 and is adapted for swinging movement relative thereto. Springs 48 (Fig. 13) are attached to the top edge of the yoke 47 at its ends and to the side walls of the housing 1. These springs 48 are held in tension so that they tend to draw the yoke 47, the shaft 46 and the rolls 44 and 45 toward the feeding rolls 41. The small rolls 44 and 45 bear against the edges of the card 11 and cause them to be held in frictional engagement with the feed rolls 41.

The rolls 41 have an intermittent or step-by-step movement which is obtained by means of a ratchet 49, mounted on the tube 42, and the lever and pawl mechanism which is actuated by the plunger 33' of the solenoid 33. This ratchet construction is seen in Fig. 13 and is illustrated in detail in Figures 9, 10 and 11. A lever 50 is pivotally mounted on a bracket 51, which is secured to the solenoid 33. The lower end of the lever 50 is slotted and engages a pin 52 on the plunger 33'. The upper end of the lever 50 carries a pawl 53 which is adapted to engage the teeth of the ratchet 49 and cause the intermittent movement of the rolls 41. This pawl 53 engages the teeth and causes movement of the rolls 41 only when the lever 50 is moved by the return movement of the plunger 33' due to spring 39. When the plunger is moved outwardly by the magnetic action, the pawl 53 slips over the ratchet teeth and does not move the rolls 41. A spring 54 is wound around the pin 55 on which the pawl 53 is mounted and has one end projecting outwardly and engaging the pawl 53. This spring tends to hold the pawl 53 in the position shown in full lines in Figure 11. When the plunger 33' moves outwardly, the pawl 53 assumes the position shown in dotted lines in Figure 11. The teeth of the ratchet 49 are so spaced and the lever 50 is so pivoted that the rolls 41 move the card 11 upwardly one space after each printing movement of the plunger 33'.

Fig. 8 is a detached view of the time number wheel actuating solenoid 16 with its core plunger and ratchet mechanism. The other number wheel actuating solenoids 26 and 27, are similar to this solenoid 16 and the following description of Figure 8 will suffice for all of the printing wheel actuating mechanisms. The solenoid 16 is constructed with a cylindrical bore in which lies the armature or core 56. A plunger or rod member 57 is preferably made integrally with the core 56 and projects out from the end of the solenoid 16. A pawl 58 is pivoted at the end of the plunger 57 and a spring 59 is adapted to keep the pawl 58 in engagement with the ratchet teeth 60. The core 56 extends out through the opposite end of the solenoid 16 and is threaded for the locking nuts 61 which hold the retracting spring 62 in position and provide means for adjusting the plunger movement. When the circuit to the solenoid is broken the parts assume the positions shown in Fig. 8. When the circuit is closed the solenoid coil 16 is energized and the core 56 is drawn into the cylindrical aperture or bore. This movement causes the plunger 57 and pawl 58 to move and turn the ratchet wheel 60' through a certain definite angle. As soon as the circuit is broken the spring 62 draws the core 56 in the opposite direction until the flange 63 engages the end of the solenoid 16. On this backward movement of the plunger the pawl 58 does not engage the ratchet teeth and cause movement of the ratchet wheel, but merely slips over them in well known manner. Each time the solenoid 16 is energized the ratchet wheel 60' is turned just enough to bring the next number on the printing wheel into printing position.

The plunger 57 is preferably of square cross-section and is guided by a clip or guide 64, having a corresponding square aperture, through which the plunger 57 extends. This guide 64 is mounted on the end of the solenoid 16 and prevents the plunger 57 from rotating and thus throwing the pawl 58 out of engagement with the teeth of the ratchet wheel 60'. The plungers of all of the solenoids used in my recording device are preferably of the same square cross-section and guided by similar guide members.

The lower ribbon roll 29 has end flanges 65, which are adapted to guide the inked ribbon 28 and hold it in proper position relative to the record card. A shaft 66 supports the roll 29. The sleeves 67 and 68 hold the roll in the proper position relative to the sides of the casing 1. A coiled spring 69 encircles the shaft 66 within the roll 29. One end of this spring 69 is secured to one of the end flanges 65 and the other end to the shaft 66. In assembling my recording device the ribbon 28 is wound on the roll 29 without twisting or winding up the spring 69. The outer end of the ribbon 28 is lead upwardly and secured to the upper ribbon roll 32. The upward feeding of the card causes the ribbon to be unwound from the roll 29 and wound on to the roll 32. As the ribbon unrolls from the roll 29 the spring 69 is twisted or wound up and a downward pull is constantly exerted on the ribbon 28 causing it to be wound tightly on the upper roll 32.

To rewind the ribbon from the upper roll to the lower roll at the end of a day's operation, it is only necessary for the operator to pull out on the rod 70 (Fig. 13). The inner end of this rod 70 is secured to the yoke 47 which carries the upper ribbon roll 32. By pulling outwardly on the rod 70 the rolls 44 and 45 are swung back out of contact with the card and the spring 69, being wound up, will turn the bottom ribbon roll 29 to re-wind the ribbon thereon. It will be understood that the spring 69 will be of such strength that it will not interfere with the proper feeding of the card, but will be strong enough to easily and quickly re-wind the ribbon.

The solenoid 16 which operates the time-indicating number wheels 14 and 15, and the solenoid 33 which operates the time-printing means are both controlled to be energized at 5 minute intervals by the time-clock circuit making and breaking mechanism. However, it will be clear that these two solenoids should not be permitted to operate at the same instant as this would cause an imperfect printing and might otherwise injure the mechanism. To obviate this possibility I have provided a switch mechanism described below.

Referring to Figure 4 of the drawings the switch actuating lever 71 is pivotally mounted on a pin 72 and normally held in a horizontal position by the spring 73. When the lower end of the plunger of solenoid 16 moves upwardly due to the energizing of the solenoid coil, the adjusting nuts 61 momentarily engage the end of the lever 71 and then slip by, allowing the lever to resume its normal horizontal position. On the downward stroke of the plunger the nuts 16 again engage the end of the lever 71, pushing it down and causing the other end to rise. As this latter end rises it lifts the spring conductor 74 into contact with the terminal 75, closing an electrical circuit to the solenoid 33. The period during which the switch is closed is momentary and as soon as the nuts 61 slip past the lever 71 on their downward movement, the lever again resumes its normal horizontal position and the member 74 springs out of contact with the terminal 75, breaking the circuit. It will be seen from the above description that the switching mechanism (indicated at 92 in Fig. 7) controls the action of the solenoids 16 and 33 so that when the time-clock circuit is closed the time indicating printing wheel actuating solenoid 16 is first energized and, as its plunger is on its return stroke, the solenoid 33 is energized and the printing mechanism actuated. This construction positively prevents the printing mechanism from operating while the time indicating printing wheels are being turned.

A plate 76 of brass or other electrically conductive material is secured to the side of the operation indicating wheel 17 (Fig. 16). This plate 76 is so located that when the wheel 17 is in one position, the plate 76 will contact with and complete an electrical circuit between the extending fingers 77 and 78. As shown in Figure 16 of the drawings this plate 76 is contacting with the fingers 77 and 78 and the circuit between them is completed. When the wheel 17 is rotated in either direction the plate 76 is removed from contact with the fingers 77 and 78 and the circuit is broken. Figure 17 illustrates the cross-sectional shape of the fingers 77 and 78. The plate 76 is adapted to slide in between and contact with the sides of the U-shaped fingers 77 and 78 and thus make good electrical connection between them. The plate 76 is located in such a position on the printing wheel 17 that it completes the circuit between the arms 77 and 78 only when the numeral 0 is in the printing position. The operation and function of this mechanism will be more fully understood when the complete electrical system of the recording device is explained later.

The workman's key 79 (Figure 18) carries the workman's number in raised printing numerals at its end. This key and the foreman's key 80 are shown in position in the key holes 7 and 8 respectively, in Figure 18. When the keys are inserted as far as they will go the numbers on their ends are adjacent the printing ribbon 28. The printing platen 81 is adapted to force the card 11 and the ribbon 28 against the number on the ends of the keys 79 and 80, thus printing the numbers on the card. The printing platen 81 is carried by the plunger 82, which is actuated by the key number printing solenoid 35. The foreman's key 80 does not serve any purpose except to print the foreman's number on the card. The workman's key 79, however, causes the workman's number to be printed on the card and also actuates an electrical switch mechanism, which closes the circuit to certain of the solenoids as will be more fully explained in reference to the wiring diagram in Figure 7. This switch is shown in detail in Figure 19, the key 79 being in position and the printing platen 81 being in its withdrawn or non-printing position. The slot 7 is formed in a block 83 of hard rubber or other suitable insulating material. The buttons 84 are held in position in holes in the block 83 by means of the spring conductors 85. When the key 79 is inserted in the slot 7 it separates the buttons 84, which push outwardly on the spring conductor members 85 causing them to make contact with the terminals 86 and 87, thus completing the electrical circuits illustrated in Fig. 7. As the key 79 operates a pair of switches which are connected in separate electric circuits, it will be seen that the buttons 84 should preferably be made of an insulating material so that the circuit will not be shorted by the key 79. When the key is withdrawn the buttons 84 move inwardly in the holes in the block 83 and the conductor members 85 spring out of contact with the terminals 86 and 87. Detents 88 and 89 may be provided in the keys 79 and 80 so that the ends of the buttons 84 may slip into these detents when the keys are in a fully inserted position. These detents tend to hold the keys in position in the slots so they will not be moved outwardly by the pressure of the printing platen 81 against the card 11.

A knob 90 is carried on the end of the shaft 13 which carries all of the number wheels. This shaft 13 is so keyed to the number wheels that when the knob 90 is turned the cumulative production time indicating wheels 19 and 20 and the piece counting wheels 21, 22, 23, 24 and 25 may all be set back at 0. Thus, if any time during a day's operation the machine is changed over from making one article to making another, the production time and the piece counting printing wheels may be set at 0 when production is started on the new article. The time of day and operation indicating printing wheels, however, will not be moved by the setting back of the production time and piece counting number wheels and the device will print the correct time of day every five minutes regardless of whether or not the number wheels have been set back to 0 one or more times during the day's run. The set back mechanism is of the standard type commonly used in connection with the illustrated multiple wheel counters and will not be described here as its details form no part of this invention.

The electrical system of my recording device consists essentially of a plurality of electric circuits including the electro-magnetic actuating means. In one of these circuits the current is lead from a supply line through a time clock which is adapted to close the circuit at definite time intervals, such as every five minutes, and to the solenoids 16 and 26 which actuate the actual time indicating and cumulative production time indicating printing wheels. The solenoid 16 is connected to operate every five minutes as long as the clock is running and connected to the supply line. The solenoid 26 is in the same circuit and receives its current from the same supply line as solenoid 16, but is connected so it will operate only when the workman's key is in position and when the operation indicating wheel 17 is turned to 0, indicating that the machine is operating on a production basis. All of the other solenoids used in my recording device are energized from a separate current supply and are only co-ordinated with the time number wheel actuating solenoids 16 and 26 through a switch 92, actuated by solenoid 16 to complete the circuit to the other solenoids.

The key printing solenoid 35 is independent of the other solenoids and is operated by a push button 91, which is adapted to close the circuit between this solenoid 35 and the supply line. The printing solenoid 33 is connected to the same supply line as solenoid 35, but is entirely independent of solenoid 35 in its operation. This solenoid 33 is adapted to be energized at five minute intervals whenever the operator's key is in position. The solenoid 34, which is adapted to print the record of the number of pieces made and cumulative production time is subject to the same limitations as solenoid 33 in that it will only be energized when the operator's key is in position and at five minute intervals when the switch 92 is closed by the action of the solenoid 16, and furthermore, is subject to the additional limitation that it will only be connected to be energized when the operation indicating printing wheel 17 is set at 0. The solenoid 27 operates the piece counting printing wheels and is connected to be energized every time the machine completes a piece. The switch 93 corresponds to switch S in Fig. 1 and is located on the machine and operated thereby to close the circuit from the supply line to solenoid 27. This solenoid 27 is also so connected that it may be energized only when the operator's key is in position and the operation indicating printing wheel 17 is set at 0.

The supply line for the clock circuit is indicated on the wiring diagram, Figure 7, at 94. The clock contains contacting mechanism which in the illustrated embodiment of my invention completes the circuit every five minutes. Thus current flows in the leads 95 and 96 for a short interval of time every five minutes. Leads 97 and 98 connect the solenoid coil 16 to the leads 95 and 96 and it is evident that this solenoid 16 will be energized every time the clock circuit is closed by the contacting mechanism. The lead 95 extends to the finger 77 of the switch on the operation indicating wheel 17 and when this switch is closed the current passes through the lead 95 and the lead 99 to the solenoid coil 26. The lead 100 extends from the solenoid coil 26 to the switch 101 which is adapted to be closed when the key 79 is inserted in the slot 7. Connected to the other side of switch 101 is the lead 96 which returns to the time clock.

It will be seen from the above that when the workman's key is in position and the operation wheel 17 is set at 0, the solenoid 26 is connected in the time-clock circuit so that it will be energized every time the time-clock contacting mechanism closes the circuit. If however, the workman's key is removed, or the number operation indicating wheel is turned away from 0, or both of these are done, the circuit to the solenoid 26 will be broken.

Assuming that the workman's key is in position and that the operation indicating wheel 17 is set at 0, the circuit to the solenoid 34 can be traced from the supply line through the lead 102 to and through the key switch 103, through lead 104 to the operation indicating number wheel switch, through lead 105 to the solenoid coil, from the solenoid coil 34, to the switch 92 through lead 106 and back to the supply line through lead 107. If the workman's key is removed or the operation indicating wheel is turned away from 0 the circuit to the solenoid 34 will be broken and it cannot be energized. In any event, it will only be energized at five minute intervals when the switch 92 is closed by the downward stroke of the plunger of the solenoid 16, as is explained in previous description of the construction of the switch 92.

The current to the solenoid 33 passes through the lead 102 to the switch 103, and through the lead 108 to the solenoid coil 33. From the solenoid coil 33 the current passes through the lead 109, the lead 106, through the switch 92 and back to the supply line through the lead 107. This time and operation number printing solenoid 33 is not connected to the switch on the operation indicating wheel and thus will be energized every five minutes provided the operator's key is in position to close the switch 103.

The piece counter actuating solenoid 27 is energized by current flowing from the lead 110 through the switch 93, and the lead 111 to the solenoid coil 27. From the solenoid coil the current passes through lead 112 to the switch on the operation indicating wheel 17 through this switch, the lead 104, the switch 103, and from the switch 103 through the lead 102 to the supply line. It it seen from the above that solenoid 27 is not connected to the time recording mechanism in any way and is energized only when the workman's key 79 is in position, the operation indicating wheel is set at 0, closing its switch, and the switch 93, which is located on the machine tool, is closed.

As stated above the solenoid 35, which operates the printing mechanism for printing the workman's and foreman's numbers is electrically independent of the other solenoids. It is energized only when the push button switch 91 is closed causing the current to flow through the lead 113, the switch 91, lead 114 to the solenoid coil 35 and from the solenoid coil back to the supply line through the lead 115.

In Figures 20 and 21 I have illustrated a modified form of my recording device in which the time clock C of Figure 1 is eliminated and a separate contacting mechanism is provided for each recording device. This contacting mechanism may be of any desired and suitable form, that which I have illustrated being of the synchronous motor driven type. Referring to Figure 20, the contactor driving motor 116 is mounted on a bracket 117 which may be secured to the base of a suitable housing 118. The entire contacting mechanism may be built up as a unit and the housing 118 secured to the back of the housing of the recording device thus forming an integral self-contained recording unit. The electric driving motor 116 is preferably of the synchronous type such as are used in electric clocks and is designed to run at a very constant speed. A worm 120 is mounted on the end of the motor shaft 119. This worm 120 engages a worm wheel 121 which is rotatably mounted on an arm 122. This arm 122 is preferably formed integrally with the bracket 117. Contact pins 123 and 124 extend through the worm wheel and are insulated therefrom and from each other. When these pins engage the terminals of the circuits leading to the recording device the circuits are momentarily closed and the solenoids will be energized to perform their various functions. The spring contacting members 125 and 126 contact with the ends of the pins 124 and 123 respectively. Similar spring contact members are provided on the opposite side of the worm wheel 121 and are adapted to engage the opposite ends of the pins 123 and 124 to complete the circuit as will be explained in reference to the wiring diagram Figure 21.

It will be noted that the contacting pins 123 and 124 are spaced radially and offset circumferentially of the worm wheel. By circumferentially offsetting these contact pins the desired distance, the time interval between the making and breaking of the two circuits which are to be controlled may be accurately and conveniently determined. I do not wish to limit myself to the use of the type of synchronous motor illustrated as it will be clear to those skilled in the art other types of electric or spring motors which will run at a constant speed may be utilized to drive my contacting mechanism.

Referring to the wiring diagram, Figure 21, the current from the supply line is conducted to the bus bars 127 and 128 to which the various lead wires may be conveniently connected. The solenoids shown in Figure 22 are the same as those shown in Figure 7 and perform exactly the same functions in the operation of the recording device and have, therefore, been numbered the same as they are in Figure 7. Various other parts of this modified form of my invention, which are the same as those shown in the preferred form and which perform the same functions as in the preferred form, will be referred to by the same reference characters are used in reference to Figure 7.

The time indicating number wheel actuating solenoid 16 is connected to the bus bar 128 by the lead 129. The other end of the solenoid coil is connected to the lead 130, which extends to the contactor, and from the contactor to the bus bar 127 by the lead 131.

The lead 129 also extends to the switch on the operation indicating wheel 17. The current passes from this switch (provided of course that it is closed) to lead 132, the solenoid coil 26, lead 133, key switch 101, lead 134, lead 130 to the contactor and to the bus bar 127 through lead 131. Thus it will be seen that solenoid 26 will be energized every time solenoid 16 is energized provided, however, that the switch on the operation indicating wheel 17 is closed and the operator's key is in position to close the key switch 101.

The current to the printing solenoid 33 passes from the bus bar 127 to lead 135, the contacting mechanism, lead 136, lead 137, through the solenoid coil to lead 138 to the key switch 101 and from the key switch 101 to the bus bar 128 through the lead 139. This solenoid 33 will, therefore, be energized every time the contacting mechanism closes the circuit provided, however, that the workman's key must be in position to close the key switch 101.

Current to the printing solenoid 34 passes from the bus bar 127 through lead 135, the contactor mechanism, lead 136, the solenoid coil 34, lead 140, lead 141 to the operation wheel switch, from this switch through lead 142, 143 and 138, key switch 101 and back to bus bar 128 through lead 139. This solenoid 34 will be energized every time the contacting mechanism closes the circuit provided that the operation indicating wheel switch is closed and the workman's key is in position to close the key switch 101.

The key number printing solenoid 35 is independent of the other solenoids and is connected to bus bar 128 by lead 144. The current passes through the push button 91, lead 145, the solenoid coil and back to the bus bar 127 through lead 146. This solenoid will be energized every time the push button switch 91 is closed.

The piece counting number wheel actuating solenoid 27 is connected to be energized every time the machine switch 93 is closed, provided, however, that the workman's key is in position and the operation indicating wheel switch is closed. The circuit to this solenoid may be traced from the bus bar 128 through lead 147, machine switch 93, lead 148, key switch 103, lead 149, the solenoid coil, lead 142, the operation indicating wheel switch, and back to the bus bar 127 through lead 141.

From the above explanation it will appear that the form of my recording device illustrated in Figures 20 and 21 will perform the same functions and operate in substantially the same manner as the form illustrated in the other views of the drawings. The essential differences between the two forms are that, in the modified form, the time clock C is eliminated and the contacting mechanism serves to close the electrical circuits at the proper time intervals. The switch 92 (Figure 7) is also eliminated in the modified form. The contacting mechanism is so designed that the worm wheel 121 will make one revolution in the desired time, for example 5 minutes, and will close the circuits to the solenoids so that the number wheel actuating solenoids will be energized to move the number wheels just before the printing solenoids are actuated to cause the printing stroke of the plungers. This timing of the operation of the solenoids is controlled by the circumferential spacing of the contacting pins 123 and 124 on the worm wheel 121.

Although in the complete embodiments of my invention shown in the drawings, I have utilized solenoid coils having movable cores to actuate my counter wheels and printing platens it will be seen by those skilled in the art that other electro-magnetic means may be used. For example the electromagnet illustrated in Fig. 22 might be substituted for the solenoids shown in the other views. This magnet 152 has an armature 153 pivoted at 154. When the magnet coil 155 is energized the armature 153 is drawn toward the pole piece pushing up on the rod 156 and turning the printing wheel 157 by the same type of pawl and ratchet mechanism as is described above. Either a spring (not shown) or gravity may be utilized to return the armature 153 and rod 156 to their starting position after each actuating movement.

The operation of my recording device is better understood by reference to the sample record card, Figure 12, which represents a typical card as printed by the form of my device illustrated in the drawings. Starting at the top of this card it will be noted that spaces are provided for operator's name, job number, machine number, and other notations which may be of value in keeping the shop records. In the longitudinal column 116 are printed the foreman's or inspector's numbers. In the next column 117 is printed the workman's number. Column 118 is for the number of pieces made while the machine is operating on production. Column 119 records the actual cumulative running time of the machine while on production. Column 120 records the idle time of the machine, and the reason for such idle time. Column 121 indicates the actual time of day during which the machine is in operation and during which the other records were made. Column 121 also records the workman's time record, showing when he checks in in the morning, and when he leaves at night.

From the figures printed on the sample card it will be seen that workman No. 666 inserted his key in the machine at some time within the five minute period immediately preceding 7:00 a. m. After the workman inserted his key and set the operation indicating wheel 17 at 0, the first time the clock circuit was closed the solenoids caused the printing of the 0 in column 118 for pieces made, 0 in column 119 for running time, and 0 in column 120 indicating that the machine is on production. To print the number 666, the workman pushed the push button 91 as soon as he had inserted his key in the recorder. From the time the workman checked in at 7.00 until 7:15 it is seen that he produced no pieces, although the machine was on production as seen from column 120. At sometime between 7:15 and 7:20 foreman No. 100 came to the machine, inserted his key and pushed the button 91 causing his number and the workman's number to be printed on the card in columns 116 and 117. When the foreman came to the machine, he turned the operation indicating wheel to 1, which for our purposes may be taken to indicate that the machine was taken off of production at this time to set it up for new work. From 7:20 until 8:15 the machine was on set-up and, as the switch on operation indicating wheel 17 was thrown out by moving the operating indicating wheel from 0 to 1, there are no printed records in the columns 118 and 119 from 7:20 to 8:15. At 8:15 the foreman left the machine and again pushed the button 91 causing his number and the workman's number to be printed on the card. At 8:20 the machine was back on production as indicated by the idle time column 120 reading 0. On the 8:20 line it is seen that the pieces made is shown as 1, while the running time is indicated as 20. This is the correct representation, as the number of pieces made while the machine has been on production is 1, and the actual cumulative production time is 20 minutes although the first 15 minutes of this period were without results as far as production was concerned. At 8:25 the inspector, 125, visited the machine, inserted his key and pushed the button 91 as indicated in column 116 on the card. By this time 3 pieces have been made. From 8:25 until 9:15 the production went along at a more or less constant rate of approximately 1 piece per minute as is shown by the pieces made column, 118. The rest of the card until 11:30 may be considered as being normal operation, the inspector calling at the machine at 9:20 and remaining until 9:40 as indicated in column 116. While the inspector was at the machine the operation wheel was set at 2 indicating a breakdown. At 11:30 the workman pushed the button 91 causing his number to be printed in column 117. He then removed his key from the machine. This is indicated on the card by the fact that there is no printing on the card after 11:30, the removal of the workman's key breaking the electrical circuit to each of the printing solenoids 33, 34, and 35.

It will be seen from the above that the embodiment of my invention illustrated and described herein is adapted to make a printed record of the workmen's activities during the day and also the operation of the machine. From columns 118, 110, and 121 the efficiency of the workman can be determined. For example, it is seen that from 8:25 to 8:30 only three pieces were produced. Starting at 8:25 and continuing on until the workman left the machine at 11:30 approximately five pieces were produced during five minute interval between the printing operations of the recording device. This would indicate that the workman and the machine were operating at a steady and efficient rate. By comparing the number of pieces made in different five minute intervals throughout the day it can be determined during what time of day the workman produces the most pieces and whether or not he is working in an efficient manner. Having these records available at five minute intervals is of great value and permits the foreman or other official to check up on each machine and eliminate any troubles which are slowing up production before the production loss becomes great.

Many other uses and advantages of my card system will be seen by those skilled in the art of keeping production records in factories and in making time studies.

Although I have described the illustrated embodiments of my invention in some detail, modification and variations such as the use of the electromagnet shown in Figure 22 in place of the solenoids may occur to those skilled in the art to which it appertains. I do not, therefore, limit myself to the precise details shown and described but claim as my invention all embodiments thereof coming within the scope of the appended claims.

I claim:

1. In a recording device, the combination of a record card, a number wheel counter having printing numbers thereon, electromagnetically operated means for moving the counter, electro-magnetically operated means for causing the numbers on said counter to be printed on said record card, an electric circuit including said electro-magnetic counter wheel operating means, means for causing said electric circuit to be intermittently made and broken, a second electric circuit including said electro-magnetic printing means, and means actuated by said electro-magnetic counter wheel operating means for making and breaking said second electric circuit.

2. In a recording device, the combination of a printing wheel having printing numbers, magnetically actuated means for moving said counter, a record card, a printing ribbon between said card and said printing numbers, magnetically actuated means for intermittently feeding said card and ribbon past said counter, magnetically actuated means for forcing said card and ribbon into printing relation with said printing numbers, electric circuits connecting said magnetically actuated means to a source of supply of electric current and means for making and breaking said electric circuits in timed relation whereby the printing operation occurs only when the card and number wheel are stationary.

3. In apparatus of the class described, a switch block having a slotted body portion of insulating material, a spring conductor secured to said block at one end, an actuating button having one end extending into the slot in said body portion and operatively engaging said spring conductor at the opposite end, a terminal member normally out of contact with said spring conductor and a key member adapted to be inserted in said slot in said body whereby said button will force said spring conductor into circuit closing engagement with said terminal member.

4. In apparatus of the class described, a number wheel, electro-magnetically actuated means for turning said wheel, electro-magnetically actuated means for printing from said number wheel, a key controlled switch adapted to control the flow of current to said electro-magnetically actuated means, a key for said switch having a printing number thereon and adapted, when inserted in said switch, to complete the electrical circuits to said electro magnetic means, and means for printing from said number on said key.

5. In an apparatus of the class described, a plurality of printing wheels, counters having printing numbers thereon, magnetically actuated instrumentalities for moving said printing wheel counters, magnetically actuated means for printing said numbers on a record card, an electric circuit including said magnetically actuated instrumentalities and a motor driven circuit making and breaking mechanism for controlling the operation of said magnetically actuated moving and printing instrumentalities, and means for preventing said circuit from being completed through said printing instrumentalities until after said circuit is completed through said moving instrumentalities.

6. In an apparatus of the class described, a plurality of printing wheel counters having printing numbers thereon, magnetically actuated instrumentalities for moving said printing wheel counters, magnetically actuated means for printing said numbers on a record card, an electric circuit including said magnetically actuated instrumentalities and a motor driven circuit making and breaking mechanism and controlling the operation of said magnetically actuated moving and printing instrumentalities and means for completing said circuit through said printing instrumentalities after actuation of said magnetically operated instrumentalities.

7. In an apparatus of the class described, a plurality of printing wheel counters having printing numbers thereon, magnetically actuated instrumentalities for moving said printing wheel counters, magnetically actuated means for printing said numbers on a record card, an electric circuit including said magnetically actuated instrumentalities and a motor driven circuit making and breaking mechanism for controlling the operation of said magnetically actuated moving and printing instrumentalities, and means for completing said circuit through one of said instrumentalities before completing the same through the other instrumentality.

8. The combination with a plurality of printing wheels having printing symbols thereon of a pair of solenoids for each wheel, one solenoid of each pair being adapted to move its respective wheel, the other solenoid of each pair being adapted to print the symbol thereon, a circuit connecting said printing solenoid to a source of current, a second circuit connecting said moving solenoids to a source of current, a contacting device adapted to control the opening and closing of said circuits and adapted to close one of said circuits before closing the other circuit and a current directing switch for selectively directing said circuits through predetermined pairs of solenoids.

9. The combination with a printing wheel having printing numbers thereon of a pair of solenoids, one of said solenoids being adapted to move said printing, the other of said solenoids being adapted to print the number of said wheel, a circuit connecting each solenoid to a source of electrical current and a contacting device controlling the opening and closing of said circuits, said contacting device being adapted to close one of said circuits to close said other circuit.

10. In an apparatus of the class described a printing wheel having symbols on the periphery thereof, means for printing said symbols on a record card, a solenoid for actuating said printing means, an electrical circuit including said solenoid, a switch in said circuit and means adapted upon turning movement of said printing wheel to close said switch.

11. In an apparatus of the class described a printing wheel having symbols on the periphery thereof, means for printing said symbols on a record card, a solenoid for actuating said printing means, an electrical circuit including said solenoid, a switch in said circuit and means for controlling the opening and closing movement of said switch by turning of said printing wheel.

12. In an apparatus of the class described, a plurality of time printing wheels having printing numbers thereon, a plurality of solenoids adapted to index said wheels, a plurality of solenoids having mechanisms associated therewith for causing the numbers on said wheels to be printed on a record card, electrical connections connecting said solenoids to a source of electric current, and a synchronous motor driven circuit making and breaking device disposed in said circuits for controlling the flow of current through said electrical connections to said solenoids.

13. In an apparatus of the class described, the combination of an electromagnetically actuated time printing wheel having printing numbers thereon, electromagnetically actuated printing means for causing said numbers to be printed on a record card, and a synchronous motor driven contacting device for controlling the operation of said printing wheel and of said printing means.

14. In an apparatus of the class described, a printing and indexing wheel adapted to be manually rotated, printing indicia on said wheel, means for printing said indicia on a record card, a solenoid for controlling said printing means, a second printing wheel having indicia thereon, a second solenoid for indexing said last mentioned printing wheel, means for printing said indicia on said second printing wheel on a record card, a third solenoid for controlling said last mentioned printing means, an electric circuit connecting said first mentioned solenoid to a source of current, a second circuit connecting said two last mentioned solenoids to a source of current and a contacting device operable by movement of said manually controlled printing wheel for controlling the opening and closing of said circuits.

In testimony whereof I hereunto affix my signature this 29th day of March, 1930.

MAX L. JEFFREY.